United States Patent [19]

Muller et al.

[11] Patent Number: 4,539,185

[45] Date of Patent: Sep. 3, 1985

[54] REACTOR FOR THE FIXATION OF A GAS ON A SOLID WHICH MAY BE USED IN PARTICULAR FOR CHLORINATION OF WINDSCREEN WIPER BLADES

[75] Inventors: Guy L. Muller, Sevres; Daniel F. Fraioli, Bois Colombes; Michel B. Oulie, Issy-Les-Moulineaux, all of France

[73] Assignee: Equipements Automobiles Marchal, Issy-les-Moulineaux, France

[21] Appl. No.: 557,435

[22] Filed: Dec. 2, 1983

[30] Foreign Application Priority Data

Dec. 6, 1982 [FR] France .................. 82 20405

[51] Int. Cl.³ .................................. B01J 1/00
[52] U.S. Cl. ........................... 422/233; 422/296
[58] Field of Search ............... 422/233, 296, 305

[56] References Cited

U.S. PATENT DOCUMENTS

| 1,500,715 | 7/1924 | Perczel | 422/233 |
| 2,660,512 | 11/1953 | Webster | 422/296 |
| 3,560,166 | 2/1971 | Walles | 422/233 |

FOREIGN PATENT DOCUMENTS 1092664  4/1955  France .
2312222 12/1976  France .

Primary Examiner—John Adee
Attorney, Agent, or Firm—Brisebois & Kruger

[57] ABSTRACT

A reactor for chlorinating rubber has an inlet opening which closely surrounds the rubber material entering the reactor therethrough, and hence any tendency for escape of chlorine is countered by absorption of that chlorine by the entering completely non-chlorinated rubber. The chlorinated rubber emerging from the outlet opening of the chamber is immersed in water before leaving the reactor and hence the outlet is sealed, by the water, against escape of the chlorine treatment gas. The rubber and chlorine displacements through the reactor are counter current to one another.

9 Claims, 2 Drawing Figures

REACTOR FOR THE FIXATION OF A GAS ON A SOLID WHICH MAY BE USED IN PARTICULAR FOR CHLORINATION OF WINDSCREEN WIPER BLADES

FIELD OF THE INVENTION

The present invention relates to a continuous reactor for the fixation of a treatment gas, in its vapour phase on a solid to be treated, which spontaneously fixes the said gas. Such a reactor may advantageously be used for the chlorination in the gaseous phase of windshield wiper blades, in particular, for motor vehicles.

BACKGROUND OF THE INVENTION

It is known that windshield wiper blades made of an elastomer, for instance, of vulcanised rubber, must be subjected to a surface treatment before they can be used because they have, in the absence of such treatment, an unduly high surface tackiness, a low self adherence and low abrasive resistance. There exists a certain number of physical treatment processes such a facing with solid lubricants or coating by means of suitable polymers. These processes do, however, have a certain number of drawbacks and there is, therefore, a tendency to use chemical processes based on halogens or halides such as fluorine, the fluorides, chlorine or bromine.

This chemical treatment is traditionally effected in the aqueous phase which has the drawback of limited efficiency. One may, obviously, consider a treatment in the gaseous phase in the general case where the windshield wiper blades are manufactured by moulding, for instance, in platen presses, for it is fairly easy to introduce the moulded element into a closed vessel containing a gaseous treatment atmosphere.

The applicant has, however, perfected a continuous manufacturing process for windshield wiper blades wherein there is effected a continuous extrusion of a strip whose cross section has the shape of two wiper blade sections which are interconnected by their lip zones; these zones constitute the central portion of the strip intended to be cut into two in the longitudinal direction to form two identical sections from which there will be cut out the individual lengths forming the wiper blades. The usual batchwise chemical treatment processes, especially by means of the halogens, may therefore no longer be entertained from an industrial point of view, with the means which are currently known.

If it is desired to effect a treatment of an extruded polymeric section by means of a halogen in its gaseous phase and if it is desired that this treatment should be effected on a continuous basis at the rate of production of the extruded section, one is faced with a difficult problem since the vessel wherein this treatment is to take place is necessarily open at the two ends to allow the extruded section to pass, and in this case there occur leaks of the gaseous halogen used for the treatment into the outer atmosphere. Now, it is known that the halogen gases are extremely dangerous for the personnel and the surrounding equipment so that an apparatus of this type entails the absolute obligation of taking considerable safety measures and necessitates the commissioning of costly protection equipment.

The object of the invention is to provide a reactor operating on a continuous basis and allowing the fixation of the treatment gas on a solid to be treated, without the treatment gas being able to escape outside the reactor. In the case of the making of a windshield wiper blade of a rubber polymer, the treatment gas is advantageously chlorine and the reactor according to the invention makes it possible to ensure fixation of the chlorine on the rubber, without any emanation of chlorine outside the reactor. From French Pat. No. 1 092 664, there is known a reactor for ozone treatment of polyethylene films, but in this known apparatus the treatment gas does escape outside the reactor.

BRIEF SUMMARY OF THE INVENTION

According to the present invention, the solid to be treated is displaced from the inlet of a vessel enclosing the treatment gas up to the outlet from this vessel, the emergence being effected under the protection of a liquid seal through the liquid constituting the said seal, whilst the entry is effected via an opening whose dimensions are chosen in such a way that the treatment gas is fixed by the solid to be treated before arriving outside the vessel. The dimensions of the inlet opening obviously depend on the capability of the solid to fix the treatment gas and on the throughput of the treatment gas delivered into the reactor vessel. According to the invention, when one is concerned with the fixation of chlorine on a section of a rubber material, it has been observed that the fixation was effected very rapidly if the rubber polymer was introduced hot into the treatment vessel. This property is therefore used by causing the treatment gas and the solid to be treated to circulate in counter flow so that the solid to be treated has its maximum fixation capacity upon entering the vessel and very rapidly fixes all the molecules of the treatment gas which arrive in the zone of the inlet opening.

The present invention therefore provides, a continuous reactor for the fixation in the vapour phase of a treatment gas on a solid to be treated which solid spontaneously fixes the said gas, the said reactor comprising firstly a vessel having an inlet opening and an outlet opening and secondly, means for supplying the said vessel with the treatment gas, wherein solid to be treated is introduced into the vessel by the inlet opening and displaced therein from the inlet opening towards the outlet opening, the outlet opening of the vessel being submerged in a liquid, characterised in that the wall of the vessel is sealed against treatment gas leaks and that the liquid reacts only slightly or not at all with the treatment gas and not at all with the solid to be treated, so as to constitute a liquid seal, the inlet opening delimiting around the elements passing through it, an annular clearance whose cross section and length are defined in such a way that all the flow of the treatment gas delivered into the vessel should be fixed on the solid to be treated without any notable escape flow leaking through the inlet opening into the outer atmosphere.

In a first embodiment, the solid to be treated is constituted by a succession of independent pieces carried on a carrier; in the case of the manufacture of windshield wiper blades, the independent pieces are constituted by the wiper blades and the carrier may be a conveyor belt.

In a second variant of the embodiment, the solid to be treated constitutes a continuous section which passes through the vessel of the reactor; in the case of the manufacture of windshield wiper blades, the continous section is advantageously that which leaves the extruder after passing into one or several vulcanisation ovens but before cooling.

In an advantageous embodiment, the displacement of the solid to be treated in the vessel is a continous displacement; the vessel is constituted by an inclined tube whose open base forms the outlet opening and is submerged in the liquid of the liquid seal and whose upper end comprises an inlet member; the inlet member comprises an axial channel having a slightly wider cross section but of the same shape as the cross section of the elements passing through it so as to allow a slight clearance all round; the supply of treatment gas is effected in the vessel near the outlet opening so that the circulation of the treatment gas should be effected in counter current in relation to the movement, within the vessel, of the solid to be treated.

In the case where it is desired to make windshield wiper blades for motor vehicles, the solid to be treated is a hot polymeric rubber substance whose temperature is preferably from 120° to 180° C.

In the case where the solid to be treated is a continuous section, the reactor comprises, downstream from the outlet opening of the vessel, guidance and/or conveyance means which ensure the take-up of the section and its evacuation out of the reactor; if it is desired to manufacture windshield wiper blades, the solid to be treated is an extruded rubber section; the treatment gas is chlorine and the liquid of the liquid seal is water, this water being advantageously renewed by a slight circulation; the guidance means disposed below the outlet opening of the vessel comprise at least one deflector with good sliding properties and/or at least one roller and/or at least one injector nozzle for the liquid forming the liquid seal.

The reactor according to the invention may be used for the gaseous treatment of all solids which spontaneously fix the treatment gas. As indicated above, this reactor finds a particularly advantageous application in the manufacture of windshield wiper blades because, by chlorinating the rubber polymer, one improves its sliding properties and its durability. However, a similar gaseous treatment may be used for the making of different products, with a view to improving the ageing characteristics of products or their proofing or their surface condition. The invention therefore finds its application not only in the field of the production of windscreen wiper blades but also, for example, without this list being restrictive, in the making of door seals, rubber tubes or the sheaths of electric cables.

BRIEF DESCRIPTION OF THE DRAWINGS

To render the object of the invention more readily understood, there will now be described, by way of a purely illustrative and non-restrictive example, a mode of embodiment represented in the attached drawings, in which.

DESCRIPTION OF THE PREFERRED EMBODIMENT

Figures 1, 2:
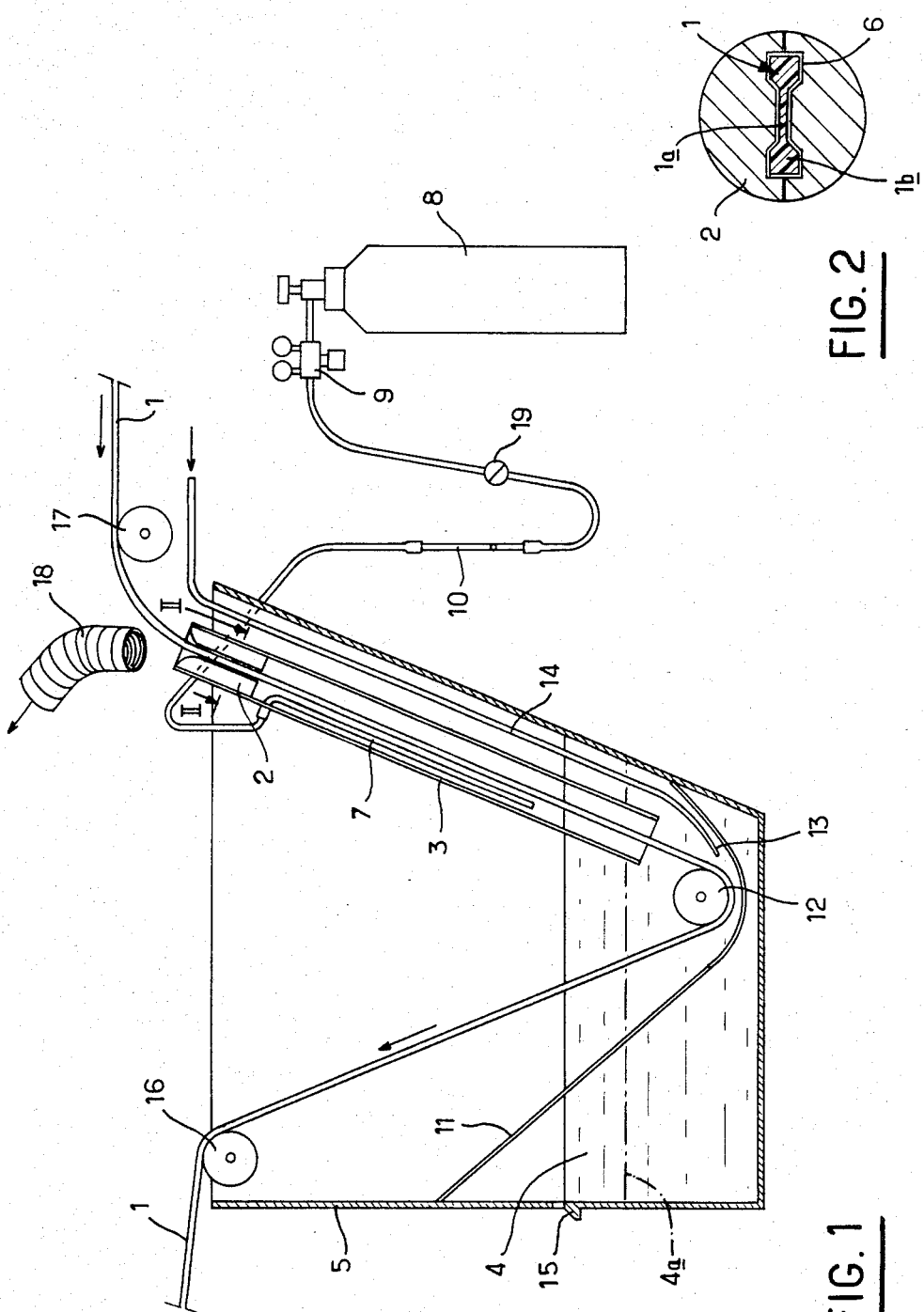
FIG. 1 represents a schematic cross section of a reactor according to the invention, intended for the chlorination of an extruded rubber section, this section subsequently having to be cut up to constitute windshield wiper blades.
FIG. 2 represents a cross section along II—II of FIG. 1.

Referring to the drawings, it will be seen that numeral 1 designates a continuous section constituted by a polymeric rubber substance extruded at a rate of approximately 40 cm/second. Section 1 is intended to form windshield wiper blades and it comprises two symmetrical opposed portions; each one of these two portions is intended to constitute windshield wiper blades after the double section has been cut to the required length at the end of manufacture. Each one of the two parts is formed by a thick zone 1b constituting the core of the wiper blade and a thin zone 1a constituting the wiper lip of the wiper blade, as shown in FIG. 2.

Section 1 is introduced into inlet member 2 which defines the inlet opening of the vessel for the treatment of the section. This treatment vessel is constituted by a cylindrical glass tube 3, whose upper end is connected to inlet member 2 and whose lower end is open. Tube 3 has a length of approximately 100 cm; it has its axis sloping by approximately 30° in relation to the vertical. The base of tube 3 is submerged in water 4 contained in a vat 5. This water thus constitutes, at the lower portion of tube 3, a liquid seal which isolates the interior of tube 3 from the outer atmosphere, the only communication remaining being that which is effected via inlet member 2.

Inlet member 2 is constituted by two half shells which are joined in their diametral plane and which, between them, define an inlet opening 6 having, in cross section, the same shape as double section 1. The cross section of the inlet opening 6 is slightly larger than the cross section of double section 1 so as to arrange a slight clearance between section 1 and the inlet opening 6. Externally, the inlet member 2 has a cylindrical shape and is situated in the extension of tube 3. The clearance between the inlet opening 6 and section 1 amounts in all to 1 cm². The length of the inlet opening 6, measured along the axis of inlet member 2 is 20 cm. Ahead of inlet opening 6, inlet member 2 has a directing funnel which allows section 1 to be easily introduced into the inlet opening 6; this introduction must, in effect, be effected when the process is started at the speed with which the section leaves the extruder.

In tube 3, there issues a supply ducting 7 which introduces the treatment gas into the said tube. Ducting 7 is connected to a cylinder 8 containing chlorine compressed at 6 bars; this cylinder delivers the chlorine to a reducing valve 9 which is set so as to obtain downline a pressure of 100 relative millibars. The discharge obtained on leaving reducing valve 9 is metered by a consumption meter 10 before being directed into the supply ducting 7. The ducting 7 opens out in the lower portion of tube 3, above the level of water 4 contained in vat 5. The water level represented in FIG. 1 is that which is preferable, that is to say, there is a clearance with respect to the lower end of tube 3; it is, however, obvious that this level could be lower than as shown, as long as it is not below the minimum level marked by the dot dash line 4a, this minimum level being the one which just makes it possible to ensure the existence of a liquid seal at the bottom of tube 3.

Double section 1 which is introduced into tube 3 via inlet member 2 leaves this tube already submerged in water 4 and, at the time the apparatus is started, it comes into contact with a deflector 11 constituted by a teflon coated plate. Because of the rounded shape it has at the bottom, deflector 11 constrains the section 1 to curve and to rise up again in vat 5 on passing below roller 12. To push the section 1 between roller 12 and deflector 11, provision has been made for a nozzle 13 which directs water under pressure to the lower part of roller 2 so as to push section 1 between roller 12 and deflector 11. This nozzle 13 is supplied with water by a pipe 14.

The delivery from nozzle 13 may be relatively weak, as long as the flow rate of the ejected water is sufficient to ensure guidance of double section 1. Nozzle 13 may be put into action solely at the time of starting but it may also be used on a continuous basis in order to obtain a slow renewal of water 4 contained in vat 5, this renewal being effected, for instance, via an overflow 15. This makes it possible to maintain the water temperature at a constant level, near the ambient temperature, as well as an approximately neutral pH value.

Section 1, guided upwards on start-up, as has been indicated, reemerges from vat 5 on passing over a roller 16 and is directed downline in a cooling system which, in turn, is followed by a cutting mechanism to obtain finally the required wiper blades.

The operation of the reactor described above, on a continuous basis, is as follows: section 1 emerges from the extruder and passes into an oven to ensure the vulcanisation of the polymeric rubber substance. It then arrives on a roller 17, then enters the inlet opening 6 of inlet member 2. It passes through the vessel defined by tube 3 which is filled with gaseous chlorine. On entering inlet member 2, the section has a temperature of 160° C. At this temperature, it has a great affinity for chlorine and the gaseous chlorine is fixed on the surface of the section to form a chlorinated layer. Thus treated, section 1 reemerges from tube 3 by passing over roller 12 and then over roller 16.

The chlorine introduced into tube 3 by ducting 7 circulates in counter flow to the double section 1. In the lower part of the tube, the chlorine concentration is considerable but the rubber has already been strongly chlorinated. In the upper part of the tube, the chlorine concentration is weaker but the rubber is far less chlorinated and therefore absorbs the gaseous chlorine more readily. The flow rate of chlorine introduced into the vessel is 1 l/mn at atmospheric pressure; it is regulated by a valve 19. Since the section arrives in tube 3 at a rate of 40 cm/second, nearly all the chlorine introduced into the vessel is fixed by the section between the level of water 4 and the base of inlet member 2. However, at the base of inlet member 2, there still exists a certain chlorine concentration which, in the absence of inlet member 2, would escape into the atmosphere which would be very dangerous for the personnel and the surrounding equipment. The presence of inlet member 2 allows any leakage output of chlorine to be avoided. In effect, the remaining chlorine passes into the inlet opening 6 between the section and the wall of the said inlet opening. As has been indicated above, the clearance surrounding the section is relatively small and, moreover, the section arriving in the inlet member is not chlorinated at all and is at a temperature of approximately 160° C. It follows therefrom that any chlorine leaking into the inlet opening 6, via the base of inlet member 2, is very rapidly fixed on section 1, the length adopted for the inlet opening, that is to say in the example described as 20 cm, being altogether adequate so that no leak discharge should be found when a pad soaked in ammonia is placed at the top of inlet member 2 (no white vapour). However, provision may be made by way of a safety precaution, for a suction pipe 18 placed in the immediate vicinity of inlet member 2.

It is clear that the chlorine flow to be introduced into tube 3 depends on the fixing capacity of the polymeric substance whereof section 1 is constituted and on the rate of production of the said section 1. The length of tube 3 and the length of inlet member 2 depend on the fixation rate of the chlorine on the polymeric substance and therefore on the nature of this substance and on the temperature at which it is introduced into inlet member 2; the higher the fixation rate of the chlorine, the more the extent that the length of the vessel and the inlet member can be reduced. It is also clear that the length of the inlet member 2 may be correspondingly reduced further, all other things being equal, the smaller the clearance existing around the section 1 in the inlet opening 6. It should therefore be noted that it is worthwhile to have a small clearance at the inlet opening 6 to reduce the dimensions of the apparatus. Moreover, if tube 3 has a relatively short length, it only contains a relatively small quantity of chlorine which constitutes a safety factor in the contingency of an accident in operation.

It shall be duly understood that the mode of embodiment described above is in no way restrictive and may give rise to any desirable modifications without thereby departing from the scope of the invention.

We claim:

1. Apparatus for the fixation of a treatment gas in its vapor state, on a length of solid which fixes the said gas spontaneously, said apparatus comprising:
   a reactor vessel having a sealed side wall, an inlet opening of a predetermined cross-section and length, and an outlet opening at a lower end of the vessel;
   means for maintaining said outlet opening of said vessel submerged in a liquid inert to the treatment gas so as to constitute a liquid seal;
   means for feeding a length of the solid to be treated into said vessel through said inlet opening and for moving said solid within the vessel from the inlet opening to said outlet opening;
   said solid having a cross-section slightly smaller than the cross-section of the inlet opening so that there is an annular clearance space of a predetermined cross-section and length between the solid and the interior of the inlet opening;
   means for feeding the treatment gas into the lower end of the reactor vessel above the level of the liquid seal; and
   means for controlling the feeding of the treatment gas to the reactor so that substantially all the treatment gas fed is fixed on the solid moving through the reactor vessel;
   said cross-section of the clearance space between the solid and the inlet opening being sufficiently small, and the length of the inlet opening being sufficiently long that substantially all the treatment gas tending to escape through the clearance space is fixed on the solid as the solid is fed through the inlet opening, whereby escape of the treatment gas through the inlet is substanially prevented.

2. Apparatus according to claim 1, wherein said means for feeding a length of solid to be treated into the reactor vessel comprise carrier means for conveying a succession of separate lengths of solid into and through the reactor vessel.

3. Apparatus according to claim 1, wherein said means for feeding a length of solid to be treated into the reactor vessel comprises means for feeding a continuous length of solid into and through the reactor vessel.

4. Apparatus according to claim 1, wherein said means for feeding a length of solid to be treated into the reactor comprises means for continuously moving the solid to be treated through the reactor vessel.

5. Apparatus according to claim 3, wherein said means for feeding a length of solid to be treated into the reactor comprises means for continuously moving the solid to be treated through the reactor vessel.

6. Apparatus according to claim 2 wherein said carrier means conveys the solid continuously through the reactor vessel.

7. Apparatus according to claim 1 wherein the length of solid comprises a length of polymeric rubber at a temperature in the range of 120° to 180° C.; and said means for feeding gas to the reactor vessel comprises means for feeding chlorine gas to the reactor vessel.

8. Apparatus according to claim 1 wherein the annular clearance space between the inlet and the solid is on the order of 1 cm$^2$.

9. Apparatus according to claim 1 wherein said reactor vessel comprises an elongated tube.

* * * * *